United States Patent [19]

Egnor

[11] Patent Number: 4,660,644
[45] Date of Patent: Apr. 28, 1987

[54] INFLATABLE RUBBER BLASTING HOLE PLUG

[76] Inventor: Richard Egnor, Box 305, Man, W. Va. 25635

[21] Appl. No.: 824,644

[22] Filed: Jan. 31, 1986

[51] Int. Cl.$^4$ .......................... E21B 33/13; F42B 3/20
[52] U.S. Cl. ................................... 166/285; 166/192; 102/333; 138/93
[58] Field of Search ............... 166/179, 187, 191, 192, 166/285, 286, 287, 387, 153, 154, 155, 291; 15/104.06 R, 104.17; 102/333; 138/91, 93; 251/1 B

[56] References Cited

U.S. PATENT DOCUMENTS

| | | | |
|---|---|---|---|
| 1,690,995 | 11/1928 | Pratt | 138/93 |
| 3,276,481 | 10/1966 | McNulty | 138/93 |
| 3,357,193 | 1/1967 | Fitzgibbon, Jr. | 102/333 |
| 4,343,357 | 8/1982 | Yeates | 166/154 |

FOREIGN PATENT DOCUMENTS 3032532  3/1982  Fed. Rep. of Germany ... 15/104.06 R

Primary Examiner—Stephen J. Novosad
Assistant Examiner—Terry Lee Melius
Attorney, Agent, or Firm—Richard C. Litman

[57] ABSTRACT

An inflatable hour glass shaped rubber plug is placed in blasting holes immediately after they are drilled. This plug prevents unwanted debris from entering drilled holes, during idle periods. Thus it will allow necessary space for blasting agents, resulting in a greater shattered blast, and level roadbed conditions. As a direct result, it will increase production in loading and haulage equipment, and lower maintenance cost and mining operation cost overall.

3 Claims, 3 Drawing Figures

INFLATABLE RUBBER BLASTING HOLE PLUG

BACKGROUND OF THE INVENTION

This invention relates to devices for sealing the openings in blasting holes, and more particularly concerns as inflatable, reusable device for this purpose.

In various blasting operations a number of spaced explosive-receiving holes must be drilled into the formation to be shattered. Such holes are generally several feet deep, and often must remain idle for some time while additional holes are being drilled, while other work is being done before blasting is called for, while operations at the site are temporarily halted because of weather or other reasons, and the like. During such idle periods, debris, sludge, loose dirt, water, snow, and the like may enter the hole, or even cover the hole.

SUMMARY OF THE INVENTION

The present invention is directed primarily to an elongated inflatable and deflatable device designed for closing a blasting hole or the like. The device has a maximum diameter in the uninflated state, slightly smaller than the hole so as to fit freely into the hole. In order to provide a double seal to insure that no debris or water enter the hole the device is narrower in the center of its length than towards its ends. The ends, when inflated create the seals with the blasting hole walls. The device has walls made of a single integral piece of elastomeric material. The device, when inflated, has the shape of an hour glass having spherical ends. The spherical shaped ends are joined by a conduit having a smaller diameter than the ends. The spherical shaped ends have grooves for O rings in their circumferences, and O rings positioned in the grooves to form ridges. These ridges both prevent dust and water from going down the hole and prevent slippage of the device into the hole when run over in haulage or strip mining equipment. The conduit between the spherical ends also has grooves in its circumference, and O rings positioned in the grooves to add strength to the conduit. One of the functions of the conduit is to expand to reduce the pressure in the device when one of the ends of the device is run over by haulage equipment. The conduit is approximately one half of the diameter of the ends. In both the conduit and the ends, the grooves and O rings are optional.

The device has a single valve for inflation and fast deflation. The device also has a tab having an opening for finger insertion. The tab is attached to the top of the device and makes it easy to insert and remove the device from a blasting hole.

In order to aid in the location of the device, a leash, preferably colored bright orange is attached to the device. The leash is not tied or fastened to anything else, but extends from the hole in which the device is inserted.

The method of the present invention involves closing a blasting hole by inserting into the hole an elongated inflatable device which is narrower in the center of its length than towards its ends. The device has walls made of a single integral piece of elastomeric material. The device fits freely into the hole. The device is then inflated bringing it into tight engagement with surrounding wall area defining the hole. The device is inserted completely into the hole so that none of the inflatable portion protrudes to be damaged by equipment driven over it. The leash attached to the device is inserted to aid in locating the device. The tab with a finger opening, attached to the device, aids in inserting and withdrawing the device from the hole by means of the tab with the finger opening. Inserting the device into the hole as soon as the hole is drilled has many advantages. If one waits until an idle period, some material enters the hole. While this material may not, in some cases, prevent the necessary amount of blasting ingredient from being used in the hole, it does cause an uneven surface in the rock bed below the blasting surface. As this surface is used as a roadway after blasting, the uneven surface causes slow travel by haulage equipment which in turn both slows the removal of material from working areas and causes excessive wear and tear on the equipment.

DETAILED DESCRIPTION

Figure 3:
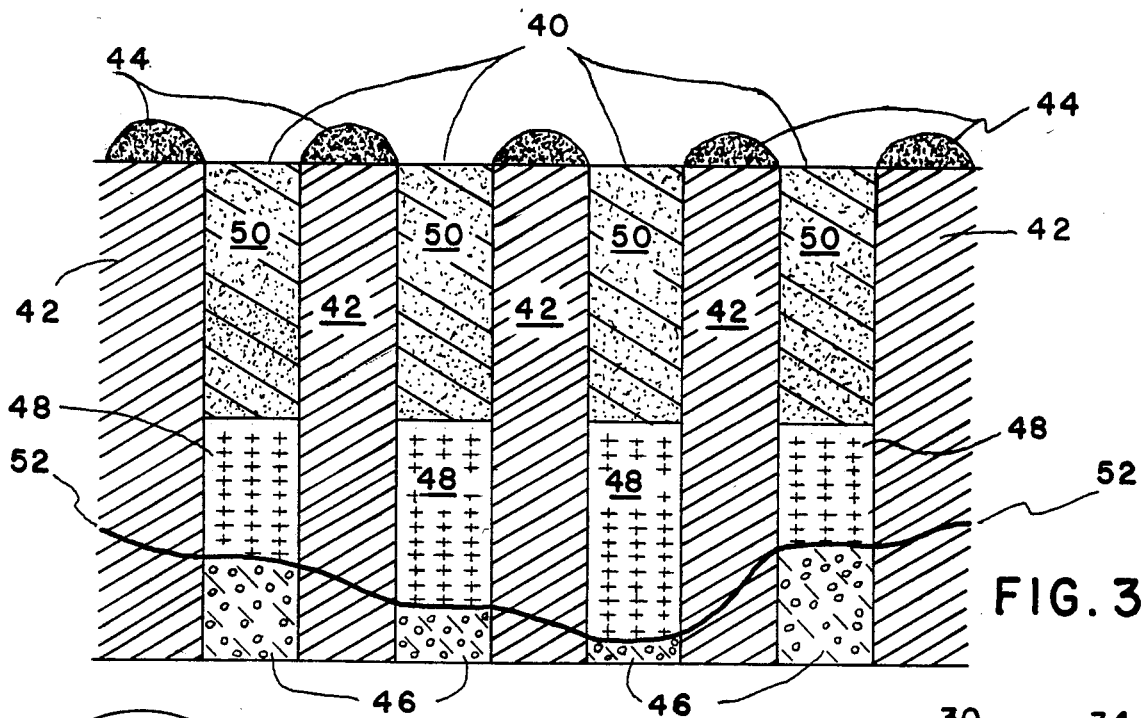
FIG. 3 is a cut away view of blasting holes prepared by the current procedure.
Figure 1:
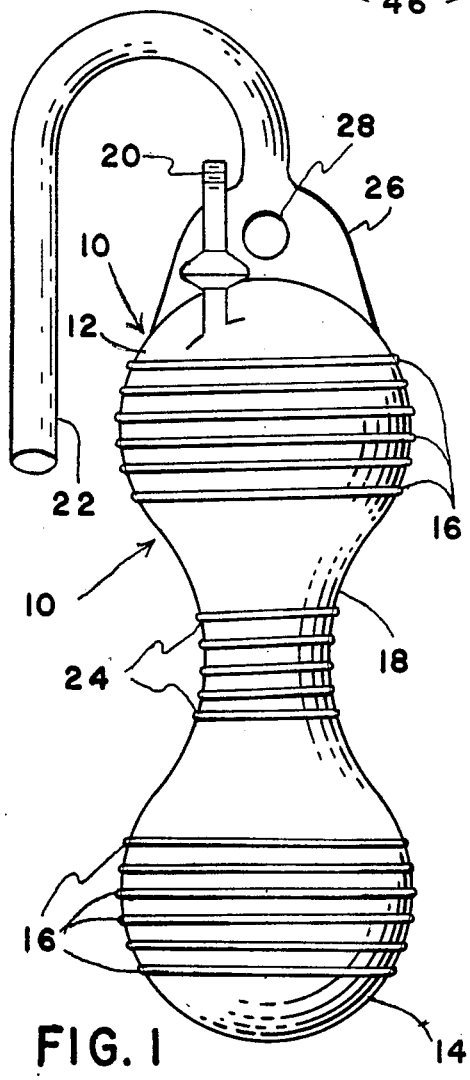
FIG. 1 shows an upright view of the hole plug, partially inflated.

The hole plug 10 is made of an elastomer and has a wall thickness of approximately one eighth of an inch. The plug 10 is in the shape of an hour glass having a largest diameter slightly smaller than the diameter of the drilled hole that is to be plugged. The ends 12 and 14 of plug 10 are spherical in shape and have O rings 16 positioned in grooves, not shown, in ends 12 and 14. The ridges formed by O rings 16 form seals when plug 10 is inflated, and prevent unwanted debris such as dust and water from going down into the drilled hole. Also these ridges prevent slippage of plug 10 into the hole when run over by haulage or strip mine equipment. Both spherical ends 12 and 14 have the same circumference, giving double protection against slippage into the hole, in the event it is run over by haulage equipment, and also double protection against water running down into the hole.

The recess 18 is approximately one half of the diameter of and positioned between the two spherical ends 12 and 14 and is designed to expand to prevent bursting, in the event that it is exposed to pressure or used on haulage roads where heavy trucks would collapse the upper ends of the blasting holes and upper spherical portion 12 as well. Recess 18 also has O rings 24 positioned in ridges around its circumference to add strength to the stress area of plug 10.

Plug 10 is approximately 18 inches in length. Plug 10 has one valve 20, by which it can be inflated and deflated quickly. Plug 10 has a rubber strap 22 colored orange, making it easy to locate the hole plug 10 which would be placed below rock level, and partially covered with dust or dirt. Strap 22 is attached to tab 26 also colored orange and containing a finger opening 28 for easy insertion and removal from the blasting hole.

Figure 2:
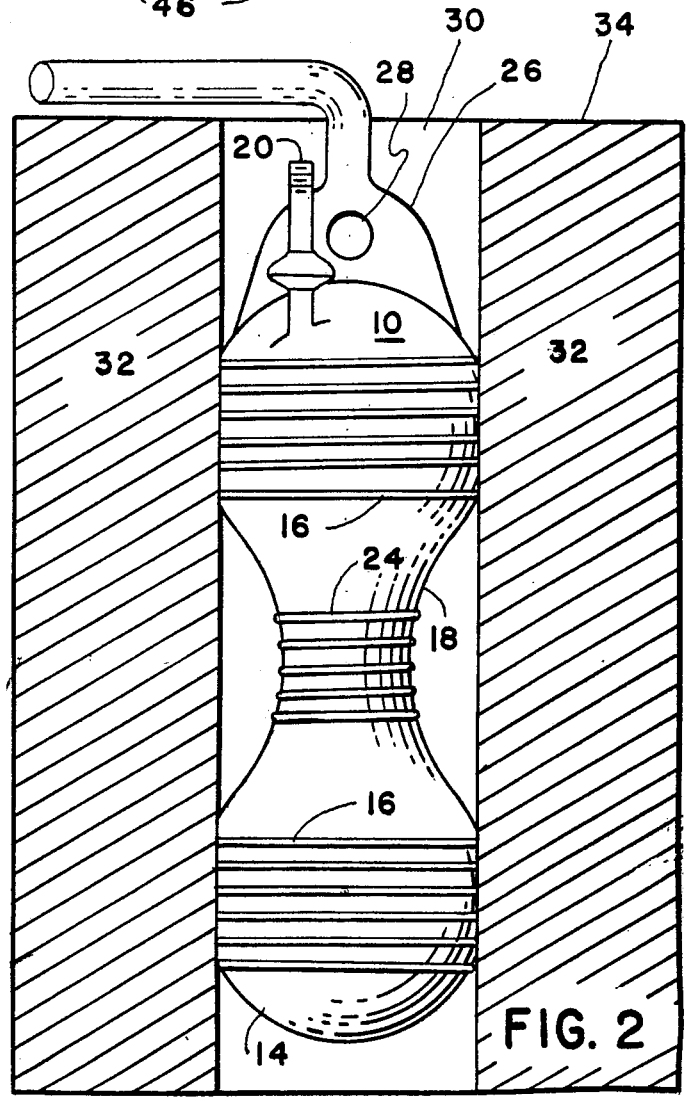
FIG. 2 shows the hole plug properly inserted into a drilled hole.

Turning now to FIG. 2, plug 10 in its inflated state is shown is hole 30 drilled in strata or rock 32 below ground level 34.

FIG. 3 depicts the current procedure of using a series of drilled holes to blast rock. This procedure produces large boulders which cannot be loaded in haulage equipment due to their weight and size. These boulders slow down production because they have to be moved by several pieces of equipment and often, more than once. It is believed that debris falling into the drilled holes is taking the place of the necessary blasting agent, that would normally create a good shattered blast, and is causing the formation of these boulders. By plugging drilled blasting holes, immediately after they are drilled, debris is prevented from falling into the holes. Immediate plugging provides for utilization of all the space needed for blasting agents, creating a greater and more effective blast. In addition, more if not all of the strata is shattered into loadable size. Also the level of the roadbed formed by the blast can be regulated by the depth of the drilled holes and not by the level of debris in the holes.

FIG. 3 shows holes 40 drilled into strata 42. Holes 40 are normally drilled in patterns of 18 feet apart, approximately six and three quarter inches in diameter and consists of as many as 50 holes in a pattern.

Drilling machines have to tram around on the benches to the locations marked off to be drilled. In the process of tramming from hole to hole, these drilling machines have often pushed dust 44 that has piled up around the holes 40 by the drilling operation, into holes 40. The amount of debris that falls into drilled holes 40 varies depending upon the amount of tramming that is done by drilling machines and by the number of holes in a pattern. A truck that contains blasting agent has to back onto drilled hole patterns in order to fill the holes with blasting agent. This often pushes unwanted debris into drilled holes, as does high wind velocities and torrential rain, especially if drilled holes 40 are in a low lying area. If drilled holes 40 are sealed immediately after drilling, this prevents unwanted debris 46 from falling into holes 40, thus allowing the necessary space and location for blasting agent 48, giving a greater blast. The filling of drilled holes 40 is completed to the top of the holes 40 using stemming material 50. When a drilled pattern is detonated, the weight of the stemming material 50 causes the blast to go downward, side to side, as well as upward. The absence of necessary amounts of blasting agent, along with debris in the drilled holes 40 results in poorly shattered material and due to the bottom level of blasting agent 48 not being at the same level from hole to hole, creates an unlevel bottom 52. The unlevel bottom 52 presents a problem in itself, because bottom 52 becomes a haulage and travelling area. This unlevel condition causes slow travel by haulage equipment which again slows the production of removing material from the working area and excessive wear and tear on mining equipment, thus resulting in high maintenance costs. These problems are reduced or eliminated by the practice of the present invention.

I claim:

1. An elongated inflatable and deflatable device designed for closing a blasting hole or the like which device has a maximum diameter in the uninflated state that is smaller than the hole so as to fit freely into the hole, wherein the improvement comprises:

The device having ends generally shaped spherically and joined by a conduit having a smaller diameter than the ends and forming a recessed portion, capable of expanding to prevent bursting in the event that it is exposed to excessive external pressure or used on haulage roads where heavy trucks may collapse an upper end of the blasting hole and the upper end of said device, O rings positioned in the recessed portions as ridges around the circumference to add strength to the stress area of the device, and the device having walls consisting essentially of a single integral piece of elastomeric material, at least one groove in the circumferential portion of the ends about the wall, O ring in each of the grooves for augmenting the closing of the blasting hole or the like, valve means mounted in the upper end of the device for inflating and deflating the device, tab attached to an upper end of the device and containing a finger receiving portion used for easy insertion and removal of the device from the blasting hole, and a rubber strap attached to the tab to aid in the location of the device in the plug hole.

2. The improvement of claim 1 further characterized by the device having the shape of an hour glass and by the strap and the tab are colored orange to provide improved identification thereof.

3. A method of closing a blasting hole within a surrounding wall area defining the hole with an elongated inflatable device having a spherical configuration at ends thereof with the ends joined by a conduit having a smaller diameter than its ends and forming a recessed portion capable of expanding to prevent bursting in the event that it is exposed to pressure and being narrower in the center of its length than towards its end, O rings positioned in the recessed portions as ridges around the circumference to add strength to the stress area of the device, and the device having walls consisting essentially of a single integral piece of elastomeric material which fits freely into the hole when in its partially inflated state the method comprising the steps of inserting the elongated partially inflated device into the hole, inflating the device and thereby distending it into tight engagement with the surrounding wall area defining the hole.

* * * * *